April 30, 1946.　　　C. R. SUSKA ET AL　　　2,399,583
LOCKABLE CONTROL DEVICE
Filed Feb. 26, 1945　　　6 Sheets-Sheet 6
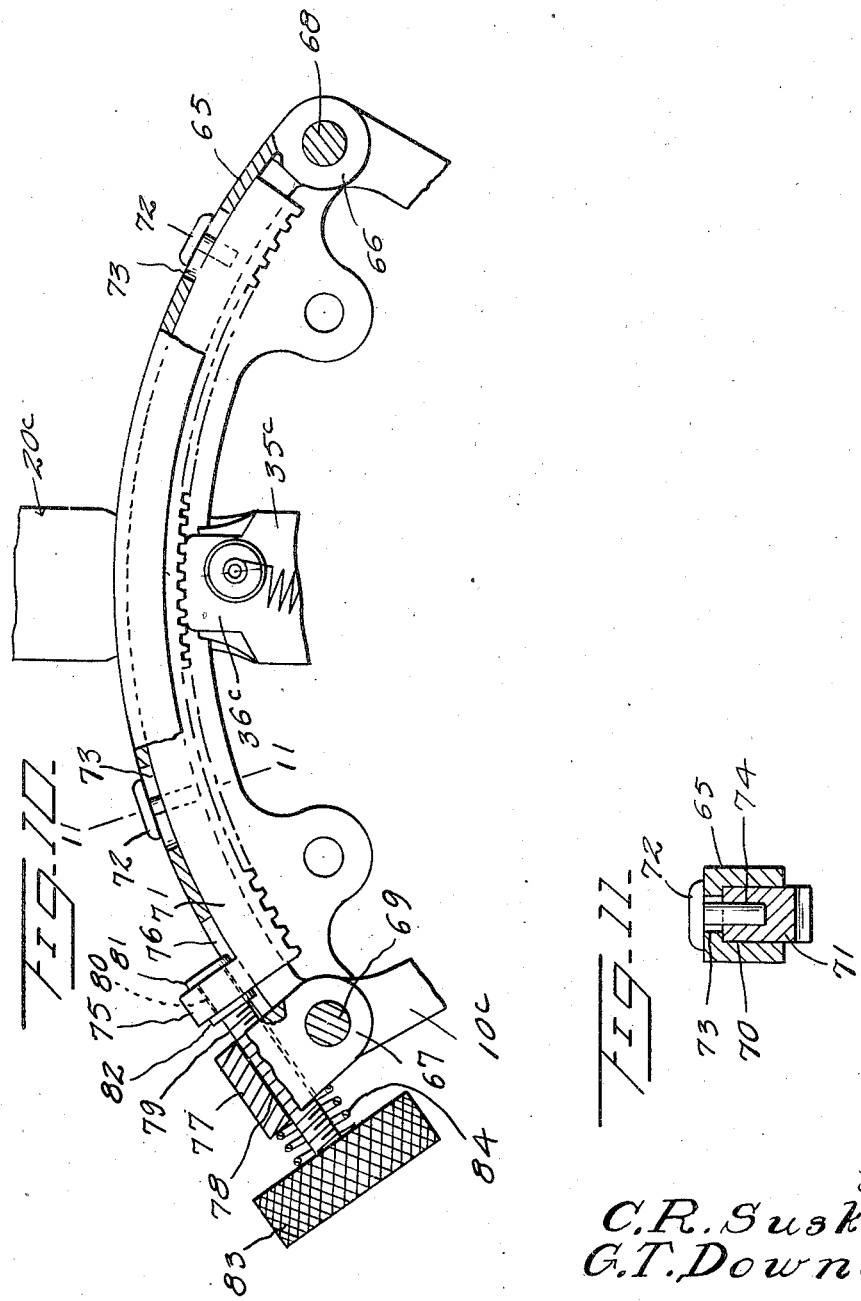

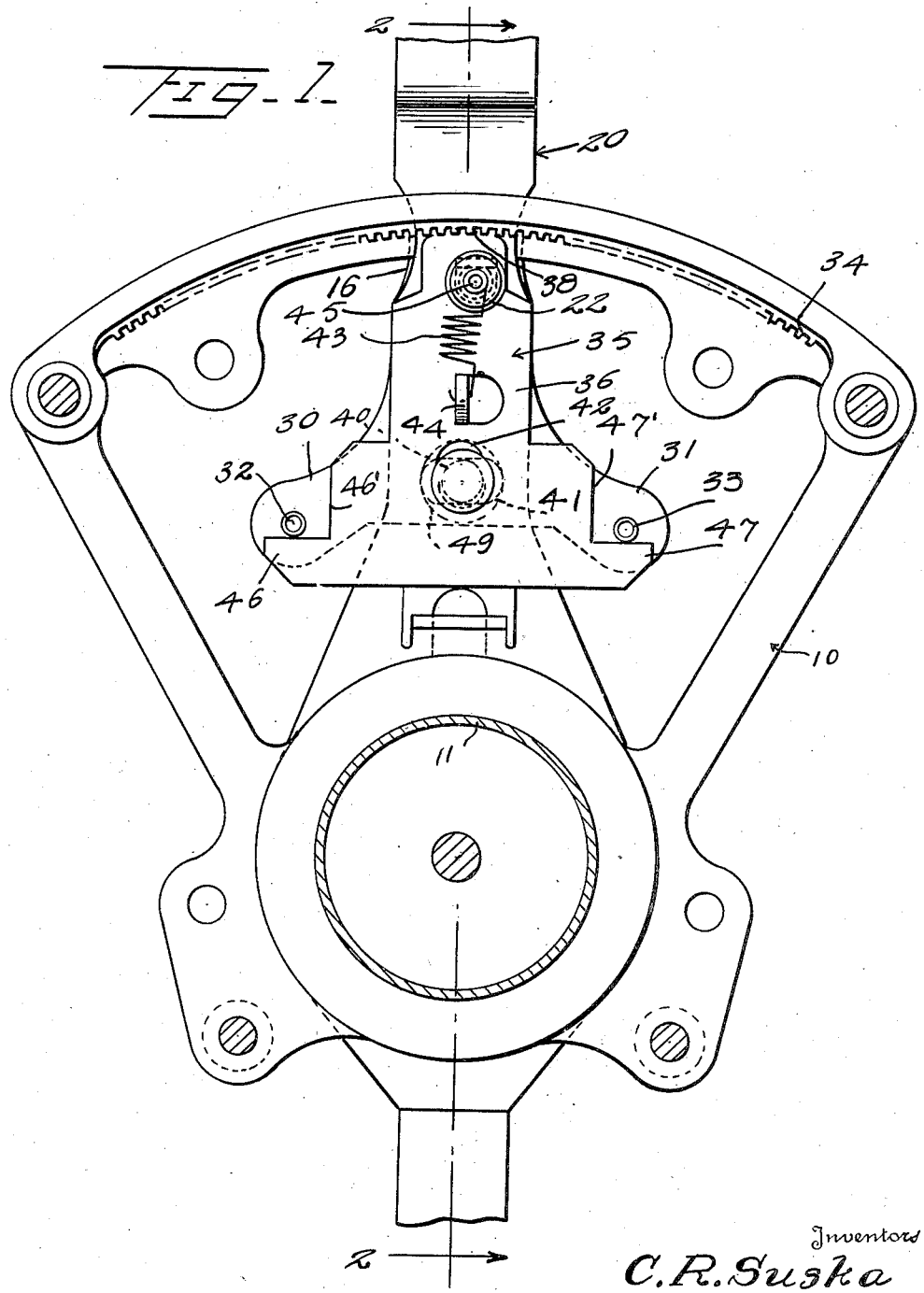

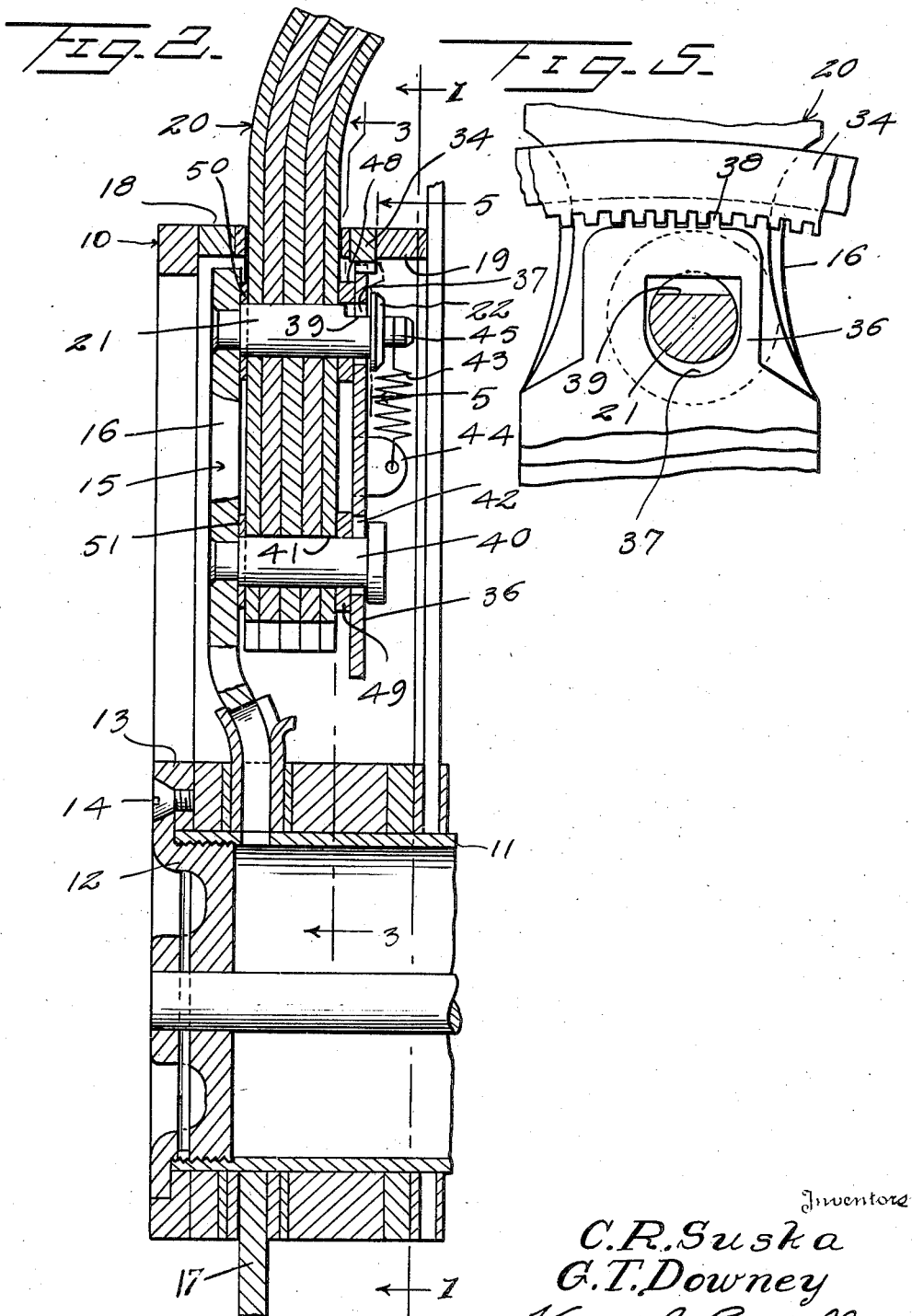

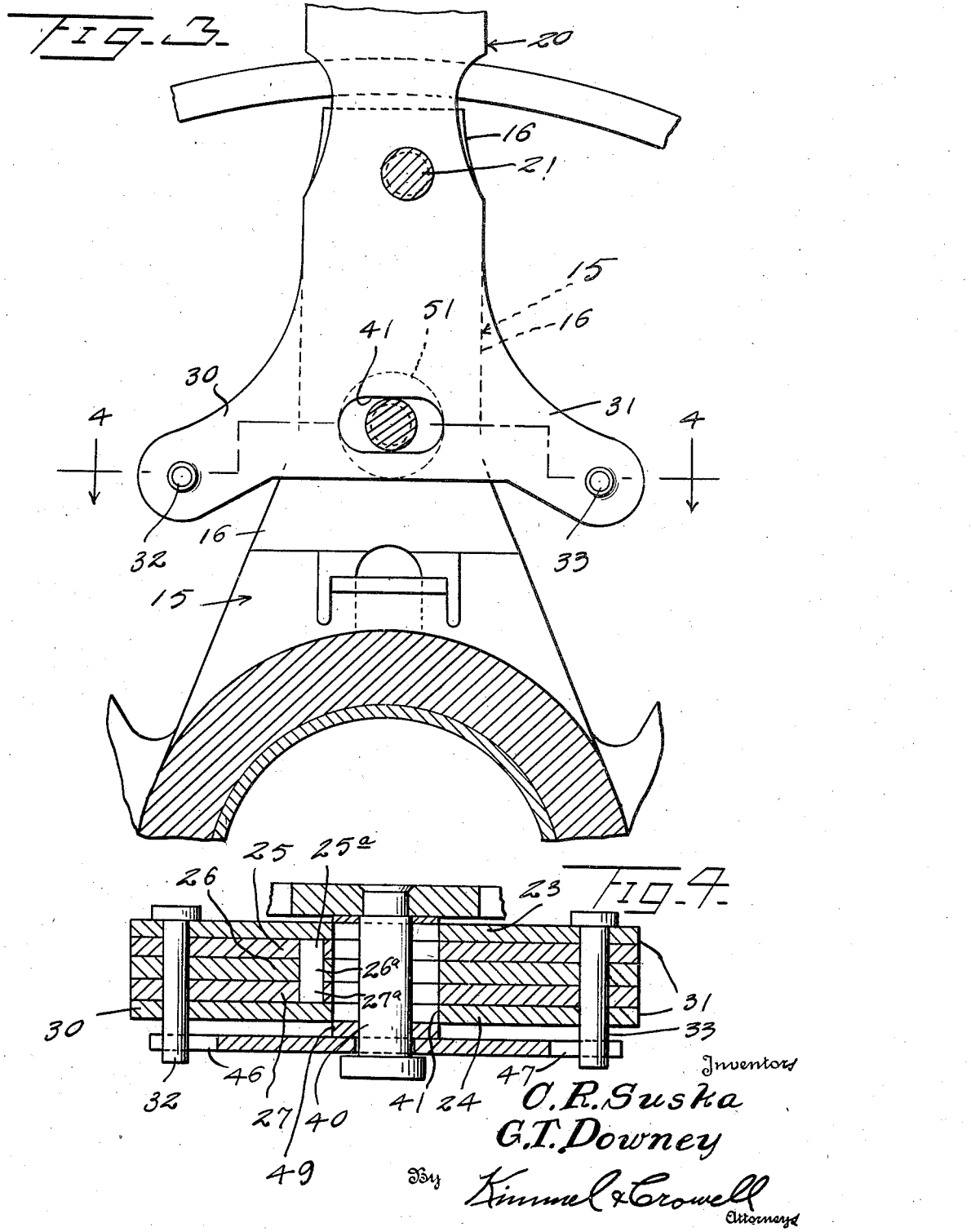

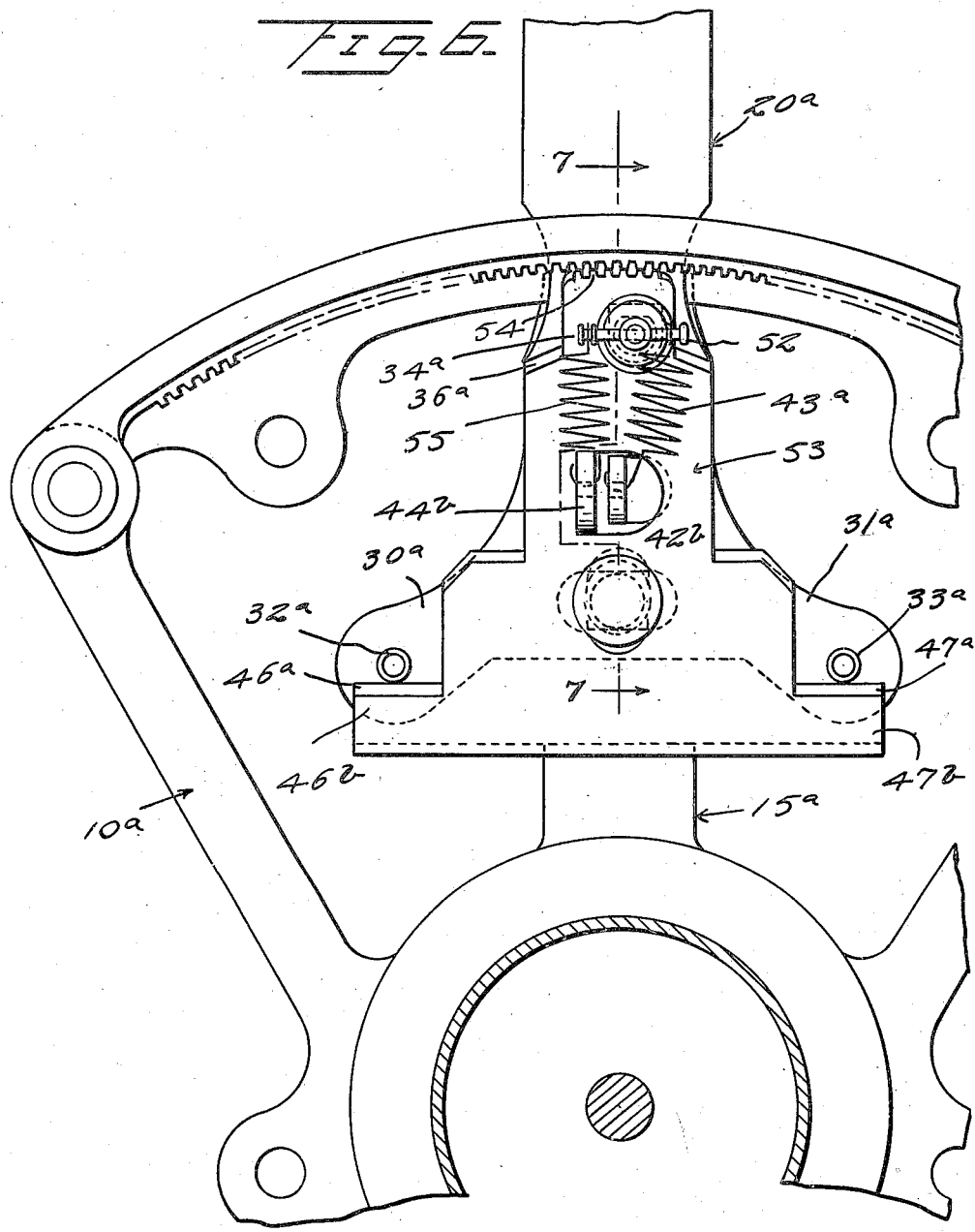

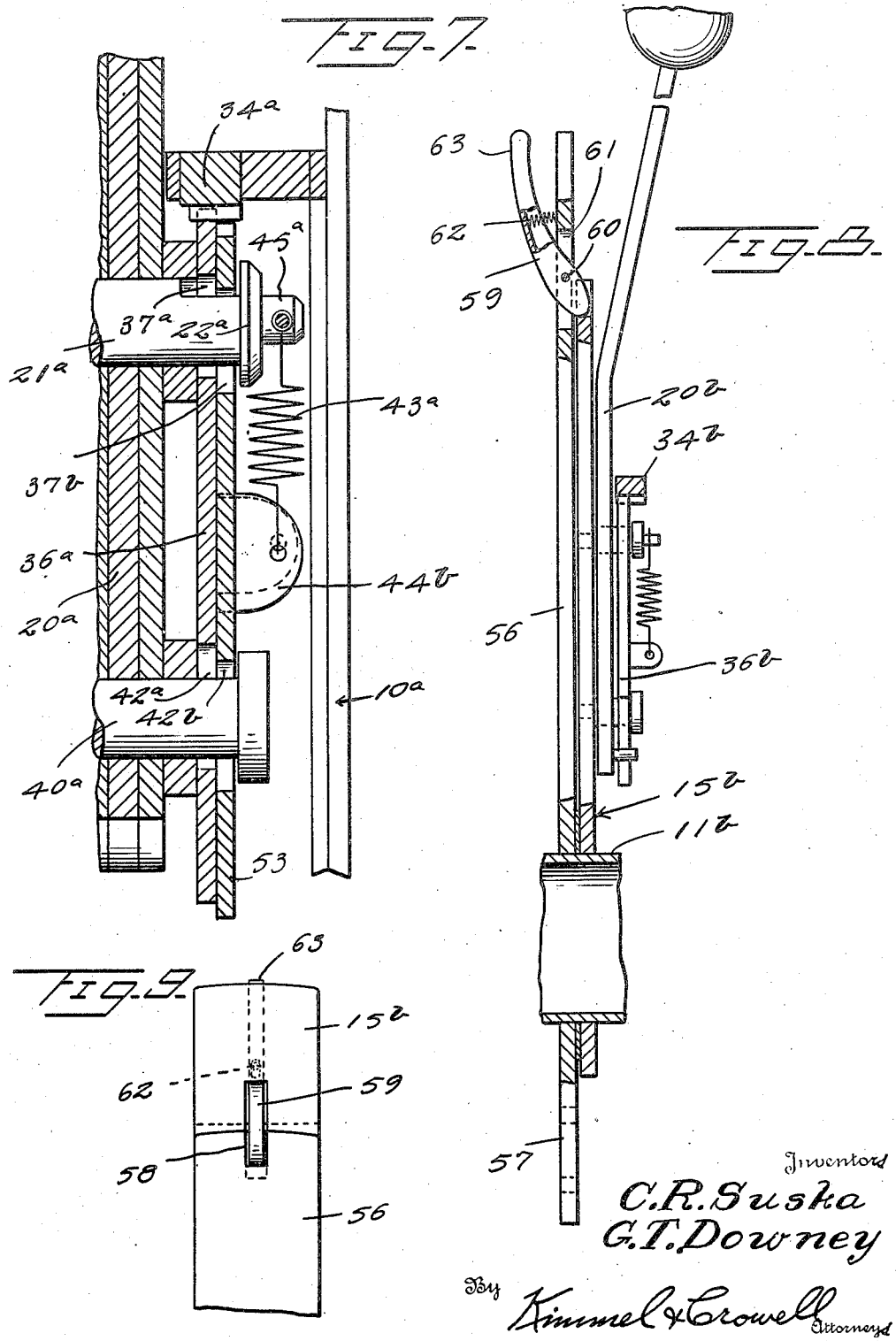

Patented Apr. 30, 1946

2,399,583

REISSUED

UNITED STATES PATENT OFFICE 2,399,583

LOCKABLE CONTROL DEVICE

Charles R. Suska, Dayton, Ohio, and George T. Downey, Corry, Pa., assignors to Aero Supply Mfg. Co., Inc., Corry, Pa.

Application February 26, 1945, Serial No. 579,852

8 Claims. (Cl. 74—536)

This invention relates to controls or quadrants such as for airplane engines and related elements.

An object of this invention is to provide an improved lever construction which will be automatically locked in a selected position so that the lever will remain in its adjusted position irrespective of the pulling or pushing force applied to the lever by the driven member.

Another object of this invention is to provide a lever which is hereinafter referred to as the drive member and which upon rocking thereof is adapted to actuate a driven member, the lever embodying means whereby it may be rocked in either direction to actuate the driven member, and when the force applied to rock the lever has been removed the lever will automatically be locked in a pre-selected adjusted position.

A further object of this invention is to provide a reversible latching or locking means for a rock lever wherein the initial movement of the lever in either direction will release the locking means and continued movement of the lever in the same direction will effect movement of the driven element, the lever being automatically locked when the force effecting its movement is released.

A particular application of this invention is to the quadrant or throttle for an airplane engine, and more particularly a quadrant or throttle control of the type embodying a main throttle operating lever and one or more secondary levers connected to the supercharger and/or propeller pitch changing mechanism, with the movement of the secondary levers synchronized with respect to the movement of the main throttle lever.

A further object of this invention is to provide in a quadrant or control of this kind a refined adjustment for the driven lever, so that the driven lever may be more finely adjusted than is the case with prior controls of this kind.

A further object of this invention is to provide a releasable latch means for the driven lever so that this lever may be optionally shifted or adjusted independently of the driving lever or the locking means associated with the driving lever.

To the foregoing objects, and others which may hereinafter more fully appear, the invention consists of the novel construction, combination and arrangement of parts, as will be more specifically referred to and illustrated in the accompanying drawings, but it is to be understood that changes, variations, and modifications may be resorted to which fall within the scope of the invention as claimed.

In the drawings:

Figure 1 is a fragmentary vertical sectional view taken on the line 1—1 of Figure 2 of a lockable control quadrant constructed according to an embodiment of this invention.

Figure 2 is a fragmentary sectional view taken on the line 2—2 of Figure 1.

Figure 3 is a fragmentary sectional view taken on the line 3—3 of Figure 2.

Figure 4 is a fragmentary sectional view taken on the line 4—4 of Figure 3, the locking pawl and related parts being shown in their normal positions.

Figure 5 is a fragmentary sectional view taken on the line 5—5 of Figure 2.

Figure 6 is a fragmentary vertical section of a modified form of lockable control quadrant.

Figure 7 is a sectional view taken substantially on the line 7—7 of Figure 6.

Figure 8 is a fragmentary vertical section partly broken away and in detail of another form of this invention.

Figure 9 is a fragmentary rear elevation of the releasable latch construction shown in Figure 8.

Figure 10 is a fragmentary side elevation, partly broken away and in section, of another modification of this invention.

Figure 11 is a sectional view taken on line 11—11 of Figure 10.

Referring to the drawings, the numeral 10 designates generally a frame structure for a throttle control quadrant, and the frame 10 includes a stationary cylindrical pivot 11, which is threaded into a plate or bearing member 12, having a flange 13 secured by fastening members 14 to the frame 10. The frame 10 has rockably mounted on the pivot 11, a rock lever 15 having an upwardly extending arm 16 and a downwardly extending arm 17. The frame 10 includes a pair of longitudinally arcuate spacer members 18 and 19 between which an operating lever, generally designated as 20, is adapted to movably engage. Operating lever 20 is pivotally mounted on a pivot 21, having a head or flange 22. The pivot 21 is disposed at a point below the upper end of the lever arm 16 and operating lever 20 is adapted to have limited rocking movement as will be hereinafter described with respect to lever 15.

Operating lever 20 is formed of a pair of outer laminations 23 and 24 and intermediate laminations 25, 26 and 27. The laminations 25, 26 and 27 are formed with longitudinally extending elongated slots 25ᵃ, 26ᵃ and 27ᵃ, respectively, so that wires or other operating means associated with the quadrant may be extended downwardly through lever 20. The laminations 23 to 27 are formed, as shown more clearly in Figure 3, with a pair of oppositely extending arms 30 and 31, and pins or rollers 32 and 33 are carried by the arms 30 and 31, the purpose for which will be hereinafter described. The frame 10 has fixed thereto a longitudinally arcuate gear or toothed rack 34 with which a lever rocking pawl 35 is adapted to be engaged for holding lever 20 and lever 15 against rocking movement under a pulling or pushing force on lower lever arm 17 connected to a driven element. Pawl 35 comprises an elongated body 36, which is formed with an elongated opening 37 adjacent the upper portion thereof, and the upper end of body 36 is formed with teeth 38 adapted to mesh with the teeth of rack 34.

Pivot member 21 extends loosely through the elongated opening 37 and preferably pivot member 21 is formed with a cutout 39 in the upper side thereof within which the upper end of the opening 37 formed in body 36 is adapted to engage. A pin 40 is fixed to lever arm 16 and extends through a transversely elongated slot 41 formed in the lower end portion of operating lever 20. In this manner operating member 20 may have limited rocking movement on pivot member 21 with respect to lever arm 16, the length of slot 41 determining the amount of rocking of operating member 20. Body 36 adjacent the lower portion thereof is formed with a vertically elongated slot 42 through which headed pin 40 loosely engages, so that pawl 35 may have vertical movement with respect to pivot member 20 and pin 40. A spring 43 is disposed on the outer side of pawl 35, being secured at one end to an outstanding lug 44 which is struck from the body 36. The opposite end of spring 43 is secured to a forwardly extending stud 45 carried by pivot member 21. In this manner pawl 35 will be constantly urged upwardly to a latched position.

In order to provide a means whereby pawl 35 may be moved downwardly to a released position when operating lever 20 is rocked on pivot 21 in either direction, we have provided a pair of oppositely extending cam arms 46 and 47. Cam members 46 and 47 are adapted to be normally slightly spaced from both pins or rollers 32 and 33, so that the teeth 38 of pawl 35 will be fully in mesh with the teeth of rack 34. The edges 46' and 47' of cam members 46 and 47, respectively, may also constitute stop means for limiting the rocking of lever 20, the pins 32 and 33 being adapted to engage edges 46' and 47', respectively, and in actual practice this construction will be the preferred construction. A bearing 48 is interposed between the rear side of pawl 35 and the forward side of lever member 20, and a bearing 49 is interposed between the lower portion of pawl 35 and lever 20. Bearing 48 engages about pivot member 21, whereas bearing 49 engages about pin 40. A bearing 50 is interposed between lever 20 and the forward side of lever arm 16, and a bearing 51 is interposed between the lower end portion of lever 20 and the forward side of lever arm 16, bearing 50 engaging about pivot 21 and bearing 51 engaging about pin 40.

Referring now to Figures 6 and 7, there is disclosed a modified form of this invention embodying a fine adjustment for the driven lever 15a. As disclosed, driving lever 20a is similar in every detail to driving lever 20, and has extending laterally from the lower end thereof pin supporting arms 30a and 31a on which cam pins 32a and 33a, respectively, are mounted. Pins 32a and 33a are engageable with cam members 46a and 47a, respectively, which are carried by spring-pressed pawl 36a, engageable with a toothed rack 34a, carried by the frame 10a. Pawl 36a is constantly urged to rack engaging position by means of spring 43a, which in the present instance has its upper end engaged with a transversely extending pin 52, which is carried by the reduced end portion 45a of pivot member 21a.

A second pawl member generally designated as 53 is slidably carried by pivot member 21a and headed pin 40a. Pawl member 53 is constructed substantially identical with pawl member 36a, except that the teeth 54 thereof are offset with respect to the teeth of pawl member 36a. In practice the teeth 54 of pawl member 53 are offset from the teeth of pawl 36a a distance sufficient so that when the teeth of pawl member 36a are engaged with the teeth of rack 34a, the teeth 54 of pawl 53 will engage the peaks of the teeth of rack 36a, as shown in Figure 6. Pawl 53 is constantly urged in the direction of rack 34a by means of a spring 55, which at its upper end engages the opposite end of pin 52, and at its lower end engages a forwardly projecting lug 44b, which is struck from the shank of pawl 53. Pawl 53 is formed at its lower end with a pair of cam members 46b and 47b similar to cam members 46a and 47a, respectively.

When pawl 36a is engaged with the teeth of rack 34a cam members 46b and 47b will be spaced downwardly from their respective operating pins or rollers 32a and 33a. Pawl member 53 is formed with an elongated opening or slot 42b through which headed pin 40a loosely engages, so that pawl member 53 may have lengthwise movement with respect to lever 20a, the upper end of pawl 53a also being formed with an elongated opening 37b similar to elongated opening 37a in pawl 36a. Pawl 36a is also formed with an elongated opening 42a similar to opening 42, whereby pawl 36a may have lengthwise movement with respect to driving lever 20a.

Referring now to Figures 8 and 9 there is disclosed another form of this invention embodying a releasable driven lever construction. In this form of the invention the driving lever 20b is similar in every detail to driving lever 20, and has associated therewith a spring-pressed toothed pawl 36b, which is normally urged into engagement with a toothed rack 34b. A driven lever 15b is mounted on a stationary pivot member 11b, and is operated in every detail the same as driven lever 15. A lever 56 is rockably mounted on pivot 11b adjacent lever 15b and is formed at its lower end with an extension 57 for connection with a suitable driven element. Lever 15b at its upper end is formed with a notch or keeper 58 in which a spring-pressed pawl 59, carried by lever 56, is adapted to normally engage.

Pawl 59 is rockable on a pivot 60 extending through a slot 61 in which pawl 59 rockably engages, and pawl 59 is constantly urged to locking position by means of a spring 62. Pawl 59 includes a handle 63 extending upwardly a sufficient distance so that pawl 59 may conveniently be selectively rocked to a released position with respect to keeper 58 in order that lever 56 may be rocked independently of lever 15b. It will, of course, be understood that the control construction disclosed in Figures 6 and 7 may be combined with the latched lever construction shown in Figures 8 and 9.

In the use and operation of the device shown in Figures 1 to 5, a driven element is connected to the lower lever arm 17. When it is desired to rock lever 15, which is the drive lever, lever 20 is rocked in the desired direction, initially rocking on pivot 21 to the limit provided by the elongated slot 41, or the engagement of pins 32 and 33 with either edge 46' or 47'. When operating lever 20 is rocked on pivot 21, as an example, in a clockwise direction, as viewed in Figure 1, pin 33 carried by arm 31 will move cam member 47 downwardly, and downward movement of cam member 47 will move pawl member 35 downwardly to disengage the teeth 38 thereof from the teeth of rack 34. Further rocking in a clockwise direction of lever 20 will move therewith lever 15. As soon as the force applied to move lever 20 is removed therefrom, spring 43 will move pawl member 35 upwardly to a latched position. Lever 15 will thereupon be latched in its selected position and any pulling or pushing force on lever 17 will not shift lever 15 or operating lever 20.

The control shown in Figures 6 and 7 will work in the same manner as the control shown in Figures 1 to 5, with the following exception: In the event the driven lever 15ª is positioned at such a point in its adjustment that the teeth of pawl 36ª will engage the peaks of the teeth of rack 34ª, then the teeth 54 of pawl 53 will lock lever 15ª in its adjusted position. In other words, as the peaks of the teeth of pawl 53 are disposed between the peaks of the teeth of pawl 36ª, lever 15ª may be adjusted and locked in its adjusted position by either pawl 36ª or pawl 53.

Referring to Figures 8 and 9, the construction therein disclosed will operate in the same manner as the construction shown in Figures 1 to 5, with the exception if it is desired to effect an adjustment of the driven lever 56 independently of the driving lever 20ᵇ, then pawl or latching member 59 is rocked outwardly to a released position with respect to lever 15ᵇ. With pawl 59 in a released position lever 56 can be adjusted to any desired position. As hereinbefore stated, the refined construction shown in Figures 6 and 7 may also be used with the releasable latch means for the driven lever shown in Figures 8 and 9.

Referring now to Figures 10 and 11, there is disclosed another modification of this invention wherein an extremely fine or vernier adjustment may be obtained with respect to the lever or levers forming the quadrant. In this form of the invention the frame 10ᶜ is similar to the frame 10 and has rockably mounted therein a driving lever 20ᶜ which is adapted to be locked in adjusted position by means of a spring pressed pawl 35ᶜ. It will be understood that the details of construction of the levers of any one or combination of the levers disclosed in Figures 1 to 9 may be used with the construction shown in Figures 10 and 11. The frame 10ᶜ has mounted therein an arcuate spacing bar 65 which is formed at the opposite ends thereof with bosses 66 and 67 through which the assembly bolts 68 and 69, respectively, are adapted to engage.

The spacing bar 65 is formed in the lower concave side thereof with a downwardly opening channel 70 within which a longitudinally arcuate toothed rack 71 is adapted to slidably engage. The rack 71 is slidably mounted in the channel 70 by means of a pair of headed pins 72, which engage over the upper side of the spacing bar 65 and loosely extend through elongated slots 73 formed in the spacing bar 65. The pins 72 are tightly pressed into openings 74, which are formed in the rack 71. The rack 71 at one end thereof is formed with an upwardly extending lug 75 which loosely engages through a slot 76 formed in the adjacent end portion of spacing bar 65. The spacing bar 65 is also formed with an upwardly projecting lug 77, having a threaded bore 78 through which a threaded bolt 79 is threaded. The inner end of the bolt or screw 79 is swivelly secured in an opening 80 formed in the rack lug 75, the bolt or screw 79 being formed with ribs or heads 81 and 82 on opposite sides of lug 75, so that the bolt or screw 79 may freely rotate with respect to lug 75, and when bolt or screw 79 is rotated and moved endwise through lug 77, rack 71 will also be moved endwise in the channel spacing bar 65.

A hand wheel 83 is secured to the outer end of the bolt or screw 79, and preferably a spring 84 is interposed between the hand wheel 83 and the outer end of lug 77, so that the bolt or screw 79 will be frictionally held against rotation.

It will be understood that the driving lever 20ᶜ may be locked, as hereinbefore described with respect to driving lever 20, to thereby adjust the driven lever or levers, and if it is desired to obtain an adjustment intermediate the pitches of the teeth of rack 71, hand wheel 83 may be rotated in the desired direction, so as to thereby bodily shift rack 71 for the desired distance. It will be understood that rack 71 is so constructed that it may be adjusted lengthwise for a distance greater than the distance between a pair of teeth on the rack 71, but under normal operating conditions if it is desired to adjust the driving lever for a distance greater than the width of one or more teeth, the driving lever 20ᶜ is used to effect this adjustment.

The lever and rack assembly constructions herein disclosed may be combined with a synchronized control for simultaneously regulating the operation of other devices such as superchargers and propeller pitch changing mechanisms, which are operated from a main lever, such as a throttle lever, in which case lever 15 will be the main lever and the other levers will be correlated with, and operated from, lever 15.

What we claim is:

1. A lever latching means comprising a stationary frame, a lever pivotally carried by said frame, a pivot pin carried by said lever, a second lever pivotally carried by said first lever and formed with a transversely elongated slot, a second pin fixedly carried by said first lever loosely engaging through said slot whereby said second lever may have limited rocking relative to said first lever, a toothed rack carried by said frame, a pawl formed with two elongated slots slidably carried on said first lever by said pivot pin and said second pin respectively, a spring constantly urging said pawl to latching position with respect to said rack, a pair of laterally offset cam arms carried by said pawl, a pair of laterally projecting arms carried by said second lever, and outwardly projecting members carried by said latter arms engageable with said cam arms whereby rocking of said second lever in either direction will move said pawl to released position.

2. A lever latching means comprising a stationary frame, a driven lever pivotally carried by said frame, a pivot pin carried by said lever, a driving lever pivotally carried by said driven lever, a toothed rack carried by said frame, a second pin carried by said driven lever, a pawl slidably carried on said driven lever formed with two lengthwise slots and normally urged to a rack engaging position, an apertured ear struck from said pawl, a spring connected between said ear and said pivot pin, correlated means carried by said driving lever and said pawl for moving said pawl to released position upon rocking of said driving lever, and a second pawl similar to said first pawl also carried on said driven lever, disposed in a position for engagement with the correlated means of said driving lever, and normally urged to rack engaging position, a second spring connected between the ear of said second pawl and said pivot pin, said second pawl being so arranged with respect to said first pawl to thereby lock said driven lever at selected points between the locking of said driven lever by said first pawl.

3. A lockable lever construction comprising a frame, a transeversely arcuate U-shaped guide carried by said frame, a pivot carried by said frame, a driven lever carried by said pivot, a driving lever rockably carried by said driven lever, a toothed rack slidably carried by said guide, said guide being formed with elongated slots, headed pins carried by said rack and engageable through said slots, a spring-pressed locking means carried by said driven lever engageable with said rack for locking said driven lever in adjusted position, correlated means carried partly by said driven lever and partly by said locking means for moving the latter to released position upon initial rocking of said driving lever, and means for adjusting the endwise position of said rack whereby to angularly adjust said driven lever independent of the adjustment of the latter by said driving lever.

4. A lockable lever construction as set forth in claim 3 wherein said latter named means includes screw threaded means.

5. A lever latching means comprising a stationary frame, a lever pivotally carried by said frame, a pin carried by said lever, a second lever pivotally carried by said first lever by means of said pin and formed with a transversely elongated slot, a second pin fixedly carried by said first lever loosely engaging through said slot, the ends of said slot constituting a limiting means for limiting the rocking of said second lever relative to said first lever, a toothed rack carried by said frame, a pawl slidably carried by said first lever and formed with two lengthwise slots and loosely engaging said pins, a spring constantly urging said pawl to latching position with respect to said rack, a pair of laterally offset cam arms carried by said pawl, a pair of laterally projecting arms carried by said second lever, and outwardly projecting members carried by said latter arms engageable with said cam arms whereby rocking of said second lever in either direction will move said pawl to released position.

6. A lever latching means comprising a stationary frame, a lever pivotally carried by said frame, a second lever pivotally carried by said first lever, a toothed rack carried by said frame, a pawl slidably carried by said first lever, a spring constantly urging said pawl to latching position with respect to said rack, a pair of laterally offset arms carried by said pawl, a cam formed on each of said arms, said cam consisting of outwardly facing right angularly disposed straight edges, a pair of laterally projecting arms carried by said second lever, and outwardly projecting pins carried by said latter arms engageable with said cams whereby rocking of said second lever in either direction will move said pawl to released position, said cams being so constructed and arranged at their inner portions as to be engaged by at least one of said outwardly projecting pins to thereby limit the rocking of said second lever with respect to said first lever.

7. A lever latching means comprising a stationary frame, an arcuate toothed rack carried by said frame, a stationary pivot carried by said frame, a lever rockably mounted on said pivot, a pivot pin carried at one end of said lever and formed with a cut-out, a second pin loosely carried by said lever, a driving lever pivotally carried by said first lever, a pawl slidably carried on said first lever, said driving lever being formed with a transversely elongated slot, said second pin loosely engaging through said slot, said pawl being formed with two longitudinally elongated slots, said pivot pin and said second pin respectively loosely engaging through said slots, an apertured ear struck from said pawl, a spring engaging said ear and said pivot pin to constantly urge said pawl to latching position with respect to said rack, a pair of laterally offset arms carried by said pawl, oppositely disposed cams carried by said arms, a pair of laterally projecting arms carried by said driving lever, and a laterally projecting pin carried by each of said latter arms engageable with said cams, whereby rocking of said second lever in either direction will move said pawl to released position.

8. A lever latching means comprising a stationary frame, an arcuate toothed rack carried by said frame, a lever pivotally carried by frame, a second lever pivotally carried by said first lever and formed with a transversely elongated slot, a pin fixedly carried by said first lever loosely engaging through said slot, a pawl slidably carried by said first lever and formed with two longitudinally elongated slots, an apertured ear struck from said pawl, a spring constantly urging said pawl to latching position with respect to said rack, a second pawl slidably carried by said first lever and formed with two longitudinally elongated slots, an apertured ear struck from said second pawl, said latter ear being slightly larger in all dimensions than said first ear, so that said first ear may project through the opening adjacent said latter ear, a second spring constantly urging said second pawl to latching position with respect to said rack, said second pawl being so arranged with respect to said first pawl to thereby lock said second lever at selected points between the locking of said second lever by said first pawl, a pair of laterally offset arms carried by said pawls, oppositely disposed cams carried by said arms, a pair of laterally projecting arms carried by said second lever, and a laterally projecting pin carried by each of said latter arms engageable with said cams, whereby rocking of said second lever in either direction will move said pawls to released position.

CHARLES R. SUSKA.
GEORGE T. DOWNEY.